United States Patent [19]

Schiel et al.

[11] Patent Number: 5,181,769
[45] Date of Patent: Jan. 26, 1993

[54] AUTOMOTIVE VEHICLE BRAKE UNIT WITH ANTI-LOCKING DEVICE

[75] Inventors: Lothar Schiel, Hofheim, Fed. Rep. of Germany; Hubertus von Gruenberg, Rochester, Mich.; Wilfried Wagner, Huettenberg-Weidenhausen, Fed. Rep. of Germany; Manfred Rueffer, Sulzbach, Fed. Rep. of Germany; Christoph Jung, Eppstein/Ts., Fed. Rep. of Germany

[73] Assignee: ITT Corporation, New York, N.Y.

[21] Appl. No.: 460,939

[22] PCT Filed: Jun. 27, 1989

[86] PCT No.: PCT/EP89/00720
§ 371 Date: Feb. 22, 1990
§ 102(e) Date: Feb. 22, 1990

[87] PCT Pub. No.: WO90/00126
PCT Pub. Date: Jan. 11, 1990

[30] Foreign Application Priority Data

| | | |
|---|---|---|
| Jul. 1, 1988 [DE] | Fed. Rep. of Germany | 3822260 |
| Mar. 13, 1989 [DE] | Fed. Rep. of Germany | 3908062 |
| Mar. 25, 1989 [DE] | Fed. Rep. of Germany | 3909924 |
| May 22, 1989 [DE] | Fed. Rep. of Germany | 3916640 |
| Jun. 13, 1989 [DE] | Fed. Rep. of Germany | 3919216 |

[51] Int. Cl.$^5$ ............................................. B60T 8/40
[52] U.S. Cl. ............................. 303/114.3; 303/113.3
[58] Field of Search ............... 303/4, 12, 114, 113, 303/114 R, 113 TR, 113 TB, 114 PN; 188/356, 357; 60/547.1; 91/376 R; 92/218.5

[56] References Cited

U.S. PATENT DOCUMENTS

| | | | |
|---|---|---|---|
| 3,556,608 | 1/1971 | MacDuff | 303/114 |
| 4,576,004 | 3/1986 | Bach | 188/356 |
| 4,643,486 | 2/1987 | Belart et al. | 303/113 TB |
| 4,659,153 | 4/1987 | Klein | 303/114 |
| 4,767,165 | 8/1988 | Burgdorf | 303/114 |
| 4,828,337 | 5/1989 | Wagner et al. | 188/356 |
| 4,932,727 | 6/1990 | Wagner et al. | 303/114 |

FOREIGN PATENT DOCUMENTS

| | | | |
|---|---|---|---|
| 0343365 | 1/1989 | European Pat. Off. | 303/114 |
| 2139722 | 11/1984 | United Kingdom . | |
| 2162605 | 2/1986 | United Kingdom . | |
| 2217800 | 1/1989 | United Kingdom | 303/114 |

Primary Examiner—Matthew C. Graham
Attorney, Agent, or Firm—Robert P. Seitter; J. Gordon Lewis

[57] ABSTRACT

An automotive vehicle anti-lock brake unit reduces operator detectable pedal pulsations and vacuum requirements found in prior systems wherein the movable wall (7) of the vacuum brake power booster (1) is movable independently of the input member (4) and that a hydraulic chamber (50) being in active connection with the input member (4) is provided whose link (90) with a pressureless hydraulic fluid reservoir (11) allows to be shut off.

9 Claims, 9 Drawing Sheets

AUTOMOTIVE VEHICLE BRAKE UNIT WITH ANTI-LOCKING DEVICE

INTRODUCTION

The present invention is related to an automotive vehicle brake unit with anti-locking device, with a vacuum brake power booster arranged between the brake pedal and the master brake cylinder as to its action with at least two power chambers divided from each other by a movable wall, the first of which being connectible to a vacuum source and the second one being aeratable through a control valve actuatable by means of an input member coupled to the brake pedal, in order to generate a boosting power being proportional to the power of the brake pedal, said first power chamber in the event of a slip control action being aeratable by means of a first valve arrangement and wheel cylinders being connected to a primary and to a secondary pressure chamber of the master brake cylinder through brake lines, with sensors which are associated with the wheels to be braked and which monitor the rotating behaviour of the wheels in order to detect any locking and whose output signals are conveyable to a central electronic control unit by means of the control signals of which electromagnetically actuatable hydraulic fluid inlet and outlet valves are controllable which are inserted in the brake lines for slip control.

BACKGROUND OF THE INVENTION

An automotive vehicle brake unit of this kind is, for example, known from the earlier patent application No. P 38 17 785.4 of the applicant. The particular feature of this prior-art brake unit consists in that it is furnished with pneumatic means which in the event of a slip control action render it possible to aerate the first power chamber and/or to evacuate the second power chamber in order to activate, respectively to inactivate the boosting power of the vacuum brake power booster in a direction opposed to the actuating apparatus of the master brake cylinder.

The brake pedal pulsating along in the event of a control action is felt to be of disadvantage in the prior-art brake unit. It is considered a further disadvantage that the second power chamber of the vacuum brake power booster requires to be evacuated in order to completely cancel the hydraulic pressure existing in the master brake cylinder, so that the vacuum requirements become comparatively large.

BRIEF DESCRIPTION OF THE INVENTION

It is, therefore, the object of the present invention to configurate a brake unit of the kind mentioned in the beginning in such a way that the said pulsation of the brake pedal in the event of a control action is eliminated. In addition, the vacuum requirements are to be considerably reduced.

According to the invention, these objects are achieved in that the movable all of the vacuum brake power booster is movable independently of the input member and in that a hydraulic chamber being in active connection with the input member is provided whose link with a pressureless hydraulic fluid reservoir allows to be shut off.

According to an advantageous embodiment of the invention, it is envisaged that the primary piston of the master brake cylinder is formed by an external piston which is axially guided in the longitudinal bore of said master brake cylinder and is in connection with the movable wall, and by an internal piston which is guided therein and is in connection with the input member. This provision allows to transmit the power of reaction to the brake pedal in a particularly space-saving way.

In order to give the driver the feeling of braking in the event of a failure of the primary brake circuit, it is envisaged in a development of the subject matter of the present invention that in the primary pressure chamber a reaction device is arranged which in the event of a failure of the brake circuit connected to it renders possible the build-up of a pressure in the secondary pressure chamber proportional to the input power and in accordance with a characteristic curve fixed previously.

The reaction device is either formed by one each annular surface being configurated at the external piston, respectively at the internal piston and interacting with an annular elastic reaction element which is preferably arranged at the secondary piston or by an elastic reaction disc being arranged within a cylindrical body and being in active connection with the external piston through a cylindrical body and with the internal piston directly and against whose side facing away from the primary piston a pressure plate is abutted at which a part of an opening mechanism of a first central valve takes support.

In order to eliminate the lost travel of the brake pedal which occurs in the event of a pressure increase above the run-out point of the vacuum brake power booster and depending on the latter's ratio, it is, furthermore, proposed that the intermediate piston is furnished with an axial bore being in connection with the hydraulic chamber at the end of which axial bore facing the primary piston an actuating piston is provided which actuates a stopping apparatus limiting the relative motion of the external piston with respect to the internal piston.

A major increase of the safety in operation of the brake unit in accordance with the invention allows to be attained in that a permanent monitoring takes place of the hydraulic chamber. Another advantageous development of the invention provides for this purpose that the link of the hydraulic chamber allows to be shut off by means of two retaining valves being connected in parallel, the individual parallel branches of said link being each one connected to a hydraulic fluid chamber the variation of the filling level of which is measurable by one each measuring apparatus whose output signals are compared to each other, in case of detection of a divergence a differential signal being generated which activates a warning device.

In order to be able to carry out a traction slip control in the inventive brake unit, a second valve arrangement is provided in a further advantageous embodiment of the invention which renders possible an additional link independent of the input member between the second power chamber and the atmosphere, simultaneously shutting off the link between the first power chamber and the second power chamber.

A particularly compact embodiment of the inventive subject matter which allows to be manufactured at low cost and in which the original shape of the booster housing is maintained without change is distinguished in that the link between the first and the second power chamber is realized through a pneumatic chamber which is connectible to the second power chamber through the control valve of the vacuum brake power booster, said pneumatic chamber being defined, on one side, by a housing part delimiting the second power chamber toward the outside and, on the other side, by a flange secured to that housing part.

Mounting of the control unit of the vacuum brake power booster according to the present invention in which the closing element of the control valve is configured in the shape of a poppet valve body is achieved according to another feature of the invention in that a bushing extending into the interior of the control valve housing is provided which is sealed off in respect of the flange, is supported in axial direction at a control valve housing containing said control valve and retains said poppet valve body.

A considerable reduction of the overall axial length of the assembly comprising the vacuum brake power booster and the master cylinder is achieved in an advantageous development of the invention in that the bushing is sealed off in respect of the flange by means of a boot whose sealing bead facing away from the flange is clamped between the control valve housing and the bushing.

In another embodiment of the inventive subject matter it is envisaged that the flange is furnished with a tubular axial extension which surrounds the control valve housing in radial direction and within which the bushing is guided with a guide collar.

A sturdy design of the inventive subject matter with excellent guiding properties is attained by this provision, so that safety in operation is greatly increased, An improvement of the centering of the control valve housing is safeguarded in another development of the subject matter of the invention in that the control valve housing is furnished with guide ribs which are abutted against the bushing in radial direction, respectively in that the bushing is furnished with radial guide ribs or guide tongues.

In order to render possible a highly sensitive activation of the vacuum brake power booster according to the invention in the event of a traction slip control action, it is, moreover, proposed that the second valve arrangement is constituted by an electromagnetically actuatable 2/2-way valve, open in the de-energized state and by an electromagnetically actuatable 2/2-way valve, closed in the de-energized state. This provision offers the possibility to realize a pressure-maintaining phase.

A further reduction of the costs can be attained in a development of the inventive subject matter in that the second valve arrangement is constituted by an electromagnetically actuatable 4/2-way valve.

According to another advantageous design version of the invention it is envisaged that the second valve arrangement is secured to the booster housing on the side of the master cylinder. This measure affords an easier access to the brake gear (from the engine compartment of the automotive vehicle) which is of advantage, for example, for fault detection, inspections and similar.

In a particularly compact, reliably operating embodiment of the invention it is envisaged that both the additional link of the second power chamber with the atmosphere and its link with the first power chamber is realized through pneumatic ducts which extend within the booster housing through the movable wall.

A further reduction of the overall axial length of the functional assembly of the vacuum brake power booster and the master cylinder in conjunction with a reduction of the volumetric capacity of the hydraulic chamber is achieved according to another inventive feature in that the hydraulic chamber is formed by an annular chamber which is defined, on one side, by the wall of a bore being configured in an intermediate element which is disposed at the master cylinder-side housing part and, on the other side, by the surface of the master brake cylinder which is slid into said bore, and within which an annular piston is sealedly guided which is connected to a valve piston actuating the control valve and which forms the intermediate piston.

In an advantageous development of the subject matter of the invention an exactly defined initial position of the intermediate piston, respectively the annular piston with minor tolerances is, finally, achieved in that the annular piston is captivated at the booster housing.

In order to largely eliminate the risk of unbraking of the vehicle in the event of an unintentional change-over of the retaining valve and anytime to guarantee the possibility of an emergency braking, it is, then, proposed that means are provided which render possible a limited motion of the input member in the direction of actuation when the retaining valve is closed.

For the substantiation of the inventive thought said before it is proposed according to an advantageous development of the inventive subject matter in which the input member is in engagement through a power transmitting element with the intermediate piston being configurated in the shape of an annular piston and arranged coaxially with the input member, respectively with the primary piston that an axial distance is provided between said power transmitting element and said intermediate piston. This provision has the result that at the start of the control action beneath the emergency braking pressure level (being prescribed by law) the input member, respectively the actuating pedal coupled to it falls through until the power transmitting element comes to be stopped at the intermediate piston. If, however, the control action of the anti-locking system occurs above the emergency braking level, then the actuating pedal is locked in that same position.

In a further advantageous embodiment a functional improvement of the actuating unit according to the present invention is achieved in that the movable wall allows to be brought into power-transmitting engagement with the intermediate piston. In this context, the arrangement is preferably selected such that the movable wall is disposed at a distance from the intermediate piston upon overcoming of which a transmission of the boosting power to the intermediate piston takes place.

In another advantageous embodiment it is envisaged that the axial distance provided between the power transmitting element and the intermediate piston is larger than the distance between the intermediate piston and the movable wall. The result achieved by this provision is that in the event of actuation and with the retaining valve functioning in the correct manner, the intermediate piston is slid under the effect of the boosting power, so that a minor foot effort is required for actuation. In the control mode, there results a falling-through travel of the input member which corresponds to the difference between the two distances.

In order to eliminate that falling-through travel, it is envisaged according to another inventive version that the axial distance provided between the power transmitting element and the intermediate piston is smaller than the distance between the intermediate piston and the movable wall. As a consequence, a higher foot effort is required in the event of actuation, since the intermediate piston is entrained by the input member.

A particularly compact embodiment of the inventive subject matter which allows to be manufactured at low cost is distinguished in that the power transmitting element projects through the input member as well as through the intermediate piston normally to its longitudinal axis and in that the intermediate piston is furnished with slots which limit the motion of the input member and whose length corresponds to the axial distance.

An exactly defined initial position of the intermediate piston is achieved in another embodiment of the invention in that the intermediate piston is prestressed by a return spring and interacts with a stop being arranged within the hydraulic chamber.

A considerable increase of the boosting power is attained according to another feature of the invention in that the vacuum brake power booster is designed tandem-type.

In order to achieve a greater flexibility during mounting of the actuating unit configured according to the invention, in particular with a control valve being arranged ranged within a control valve housing and controlling a differential pneumatic pressure acting on the movable wall, and of the components of the brake unit with anti-locking device, it is proposed according to another embodiment of the inventive subject matter than the control valve housing is combined with the input member and the master brake cylinder to form a constructional unit and is arranged separately from the vacuum brake power booster.

According to a further advantageous feature, a compact, axially short-design embodiment of the invention in the mentioned disentangled execution is achieved in that the power transmitting element is configured in the shape of a cylindrical pin projecting through the primary piston and that the intermediate piston is furnished with an axial hub which surrounds the pin radially and which is provided with a stop collar whose distance from the pin corresponds to the axial distance.

In another advantageous development of the inventive subject matter it is envisaged that the input member is positioned by a stop which is provided at the intermediate piston. This measure results in a considerable reduction of the overall axial length of said constructional unit, simultaneously minimizing its manufacturing tolerances.

In an actuating unit according to the invention in which a second link is provided between the hydraulic chamber and the hydraulic fluid reservoir a reduction of the costs of manufacture and of mounting is achieved in that the second link allows to be shut off by a motion of the intermediate piston in the direction of actuation. In this configuration, the second link leads via an opening (breather hole) which ends up in the hydraulic chamber and which is passed over by a sealing cup arranged at the intermediate piston. This measure offers a safely functioning solution in which no additional components are required.

A powerless falling-through of the input member is, finally, prevented or effectively damped according to another feature of the invention in that the opening is configured in the shape of a restriction hole.

In order in an actuating unit allowing to be applied in the automotive vehicle brake unit structured according to the invention to realize a response characteristic with a sharp rise of the output power (so-called jumper function)—"rounded characteristic curve"—it is envisaged in accordance with a further important feature that the reaction device is furnished with a power transmitting element which is arranged at an axial distance from the input member (internal piston) and which in the event of a predetermined pressure being reached in the primary pressure chamber lets become effective a force component at the input member (internal piston) directed against the power of a compression spring taking support at the boosting power output member (external piston).

In an advantageous development of the invention it is envisaged that the power transmitting element is sealedly guided within the external piston and that the compression spring takes support at an annular surface being configurated at the external piston.

Said compression spring may preferably be configurated in the shape of a cylindrical spiral spring or of a cup spring.

In order to be able to realize the response characteristic in the shape of a "rounded characteristic curve", it is envisaged in accordance with another advantageous development of the inventive subject matter that the compression spring is configured in the shape of a rubber spring whose contour allows only a partial abutment of the internal piston in the initial phase of actuation.

In this context, the end of the internal piston preferably has a calotte-shaped configuration and interacts with a conical recess of the rubber spring.

In another design version it is envisaged that the end of the internal piston is configured in the shape of a truncated cone whose cone angle is larger than the cone angle of the conical recess being configurated in the rubber spring.

In order to protect the rubber spring from damage caused by the internal piston, it is proposed according to another feature of the invention that the power transmitting element is furnished with an axial extension directed toward the internal piston and penetrating the rubber spring, whose length corresponds to the length of the rubber spring less the depth of the conical recess.

Further features, advantages and possibilities of application of the invention are revealed by the subclaims and by the following description of five embodiments, made with reference to the accompanying drawing, in which:

DETAILED DESCRIPTION OF THE VARIOUS EMBODIMENTS

In the various Figures of the drawing, components corresponding to one another are given identical reference numerals.

Figure 1:
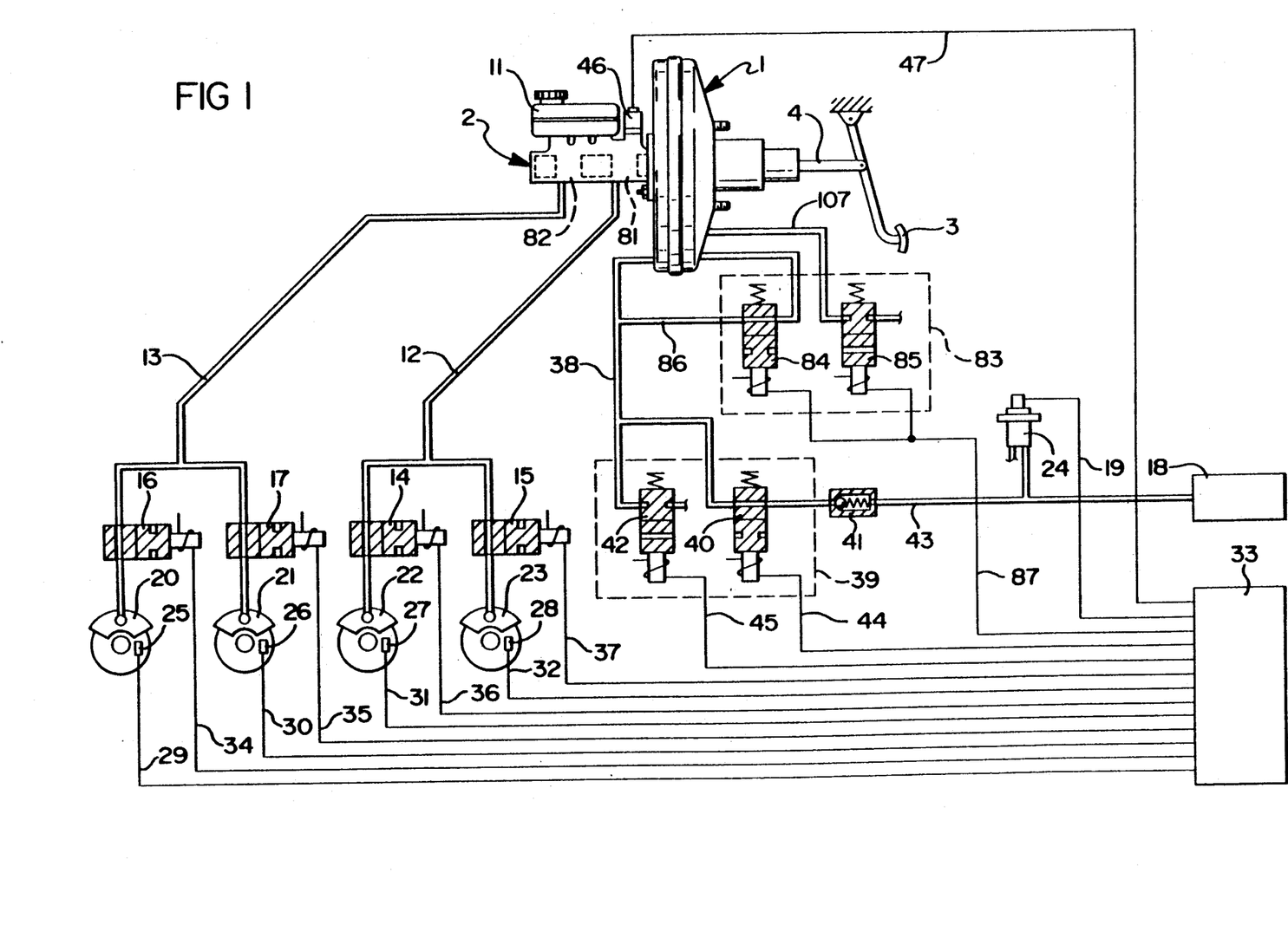
FIG. 1 shows a diagrammatic representation of an automotive vehicle brake unit in accordance with the invention.

FIG. 1 shows an automotive vehicle brake unit with anti-locking device, with a vacuum brake power booster 1 which is connected to a brake pedal 3 through an input member 4 in prior-art manner. On the side of the vacuum brake power booster 1 facing away from the input member 4 a tandem master brake cylinder 2 is provided which is in connection with a brake fluid reservoir 11. A first and a second brake circuit 12 and 13, respectively, are connected to the pressure chambers 81, 82 of the tandem master brake cylinder 2.

Through two solenoid valves 14, 15 being configurated in the shape of 2/2-way valves, the first brake circuit 12 connects the wheel cylinders of the two wheel brakes 22, respectively 23, shown only diagrammatically in the drawing to the tandem master brake cylinder 2. In this configuration, each one of the two solenoid valves 14, 15 is associated with one of the two wheel brakes 22, respectively 23. The second brake circuit 13 connects the wheel cylinders of the further two wheel brakes 20, 21 which, too, are shown only diagrammatically to the tandem master brake cylinder 2 through two further solenoid valves 16, 17 which, again, are configurated in the shape of 2/2-way valves.

With the front wheel and the rear wheel brakes 20, 21, 22, and 23 one each sensor 25, 26, 27, respectively 28 is associated which is connected to a central electronic control unit 33 through corresponding signalling lines 29, 30, 31, respectively 32. Said sensors 25, 26, 27, and 28 which may, for example, be configurated in the shape of inductive transducers monitor the rotating behaviour of the wheels and furnish relevant signals over the signalling lines 29, 30, 31, respectively 32 to the electronic control unit 33. Said electronic control unit 33 is connected through control lines 34, 35, 36, 37 to the solenoid valves 16, 17, respectively 14, 15 in order to actuate the latter depending on the sensor signals.

To the master cylinder-side power chamber of the vacuum brake power booster 1 a first valve arrangement 39 is connected through pneumatic lines 38, 43, which renders possible its evacuation, respectively aeration depending on the control signals of the electronic control unit 33. Said valve arrangement 39 is constituted by two 2/2-way valves 40, 42 which are in connection with the electronic control unit 33 by means of control lines 44, 45.

The 2/2-way valve 42 switching the atmosphere is preferably configurated in the shape of a solenoid valve, closed in the de-energized state, while the 2/2-way valve 40 switching a vacuum represents a solenoid valve, open in the de-energized state whose inlet is connected to a vacuum source 18 through a non-return valve 41.

In FIG. 1 a second pneumatic valve arrangement 83 can, furthermore, be seen which is formed by an electromagnetically actuatable 2/2-way valve 84, open in the de-energized state and by an electromagnetically actuatable 2/2-way valve 85, closed in the de-energized state. Said 2/2-way valve 84 is inserted in a link 86 shown diagrammatically between the two power chambers (not shown in the drawing) of the vacuum brake power booster 1, while the 2/2-way valve 85, closed in the de-energized state renders possible an aeration of the brake pedal-side power chamber through a second pneumatic link 107 independently of the position of the brake pedal. The two 2/2-way valves 84, 85 allow to be activated simultaneously by means of a control line 87 which is connected to the central electronic control unit 33. To the vacuum source 18 a pressure sensor 24 is, in addition, connected whose output signals is conveyable to the central electronic control unit 33 over a signalling line 19. The function of said pressure sensor 24 will be seen from the following description.

Finally, a retaining valve 46 is arranged at the master brake cylinder 2 which is in connection with the central electronic control unit 33 by means of a control line 47 and whose function will be explained in more detail in connection with the method of functioning of the automotive vehicle brake unit according to the present invention.

Figures 2, 3, 4:
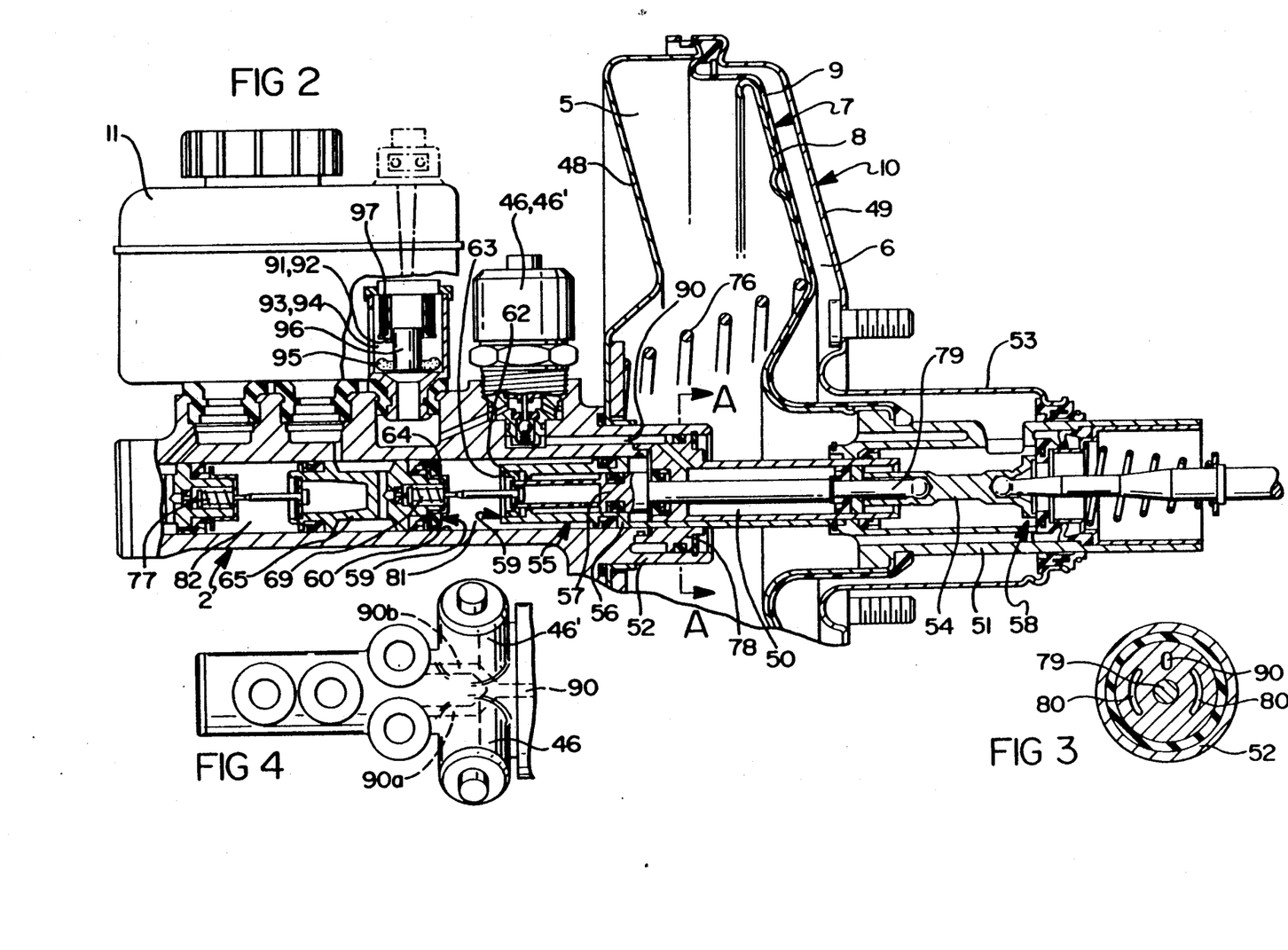
FIG. 2 shows a cross section through an embodiment of a vacuum brake power booster utilized in the automotive vehicle brake unit according to FIG. 1.
FIG. 3 shows the section along the line A—A as per FIG. 2.
FIG. 4 shows a top view of the master brake cylinder illustrated in FIG. 2.

According to FIG. 2, the vacuum brake power booster 1 is comprised of two cup-shaped housing parts 48, 49 which are assembled together with their open sides and form a booster housing 10. The housing part 48 shown on the left side as viewing FIG. 2 which is furnished with a pneumatic connection not identified by a reference numeral is rigidly connected to the tandem master brake cylinder 2, while the right housing part 49 presents a central guide socket 53 which retains a control valve housing 51 of the vacuum brake power booster 1 guiding it slidingly and vacuum-tightly.

The internal space of the booster housing 10 is subdivided by a movable wall 7 arranged therein and consisting of a diaphragm disc 8 and a rolling diaphragm 9 abutted against it, into a first power chamber 5 and a second power chamber 6 which in the event of a normal braking operation is being aerated by means of a valve arrangement 58 disposed within the control housing 51. Said valve arrangement 58 being as such prior art is actuated by a valve piston 54 which is connected to the input member 4 and is in connection with an intermediate piston 79 being slidably guided within a hydraulic chamber 50. A return spring 76 being clamped between the front housing part 48 and the diaphragm disc 8 is provided to restore the movable wall 7.

The tandem master cylinder 2 being flanged to the front housing part 48 and presenting a secondary pressure chamber 82 within a longitudinal bore 60 is furnished, at its booster-side end, with an axial extension 52 projecting into the first power chamber 5 of the vacuum brake power booster 1 and being closed by a cylindrical section 78 within whose bore the hydraulic chamber 50 is defined.

At the master-cylinder side end of the intermediate piston 79 being axially guided within the chamber 50 a part (internal piston 57) of a primary piston 55 defining the primary pressure chamber 81 is configured whose second part (external piston 56) is in connection with the movable wall 7 through arms 80 having a circular segment-shaped cross section (FIG. 3). In the example illustrated two electromagnetic 2/2-way valves 46, 46' connected in parallel are arranged at the master brake cylinder 2 which shut off, respectively release a hydraulic link 90 of the hydraulic chamber 50 with the hydraulic fluid reservoir 11, the two pressure chambers 81, 82 of the tandem master brake cylinder 2 being in connection with the hydraulic fluid reservoir 11 through central valves 69, 77 which as such are prior art and are arranged in a secondary piston 65, respectively at the bottom of the longitudinal bore 60. Finally, in order in the event of a failure of the primary circuit 12 to be able to build up a pressure in the secondary pressure chamber 82 being proportional to the power of the brake pedal, a reaction device 59 is provided in the primary pressure chamber 81 which is formed by annular surfaces 62 (external piston 56) and 63 (internal piston 57) being configured at the two pistons 56, 57 and coming to be abutted with the front surface of an elastic reaction element 64 secured to the secondary piston 65. In the event of failure of the primary pressure circuit 12 the ratio is adjustable by the selection of annular surfaces 62, 63.

In the range of the two retaining valves 46, 46' the link 90 of the hydraulic chamber 50 with the hydraulic fluid reservoir 11 forms two parallel branches 90a, 90b which are connected to one each hydraulic fluid chamber 93, 94 being preferably configured within the hydraulic fluid reservoir 11. The variations of the filling level of the two hydraulic fluid chambers 93, 94 are monitored by measuring apparatuses 91, 92 which are formed in the illustrated example by a float 95 which bears a ferromagnetic core 96 and whose vertical motion effects changes of the inductivity of a coil 97 which is connected to the central electronic unit 33.

The method of functioning of the inventive automotive vehicle brake unit illustrated in the drawing is described in the following:

In the starting position (when the engine is at a standstill) the two power chambers 5 and 6 can be under atmospheric pressure, so that the movable wall 7 is pressure-balanced and is retained by the return spring 76 at a stop not shown in the drawing which is arranged at the rear housing part 49. Since the control piston 54 is positioned through the intermediate piston 79, respectively the internal piston 57 by abutment within the tandem master brake cylinder 2, the valve arrangement 58 is in a condition in which the atmospheric sealing seat being configured at the control piston 54 is open and the vacuum seat at the control housing 51 is closed, so that the two power chambers 5 and 6 are separated from each other. Now, when the first power chamber 5 is being evacuated (when the motor is started), then the differential pressure being brought to bearing on the movable wall 7 causes the latter to move in the direction of the master brake cylinder 2, so that first of all the atmospheric sealing seat will be closed and immediately thereafter the vacuum seat be opened. As a consequence, an evacuation of the second power chamber 6 which has meantime been shut off from the atmosphere will be rendered possible, so that an equilibrium condition will be restored at the movable wall 7 in which both sealing seats of the valve arrangement 58 are closed and the vacuum brake power booster 1 is in a ready position being illustrated in the drawing.

If and when now the brake pedal 3 is actuated during braking the input member 4 jointly with the control piston 54 will be slid to the left under the effect of the power enacted, as a result whereof the valve arrangement 58 will be actuated. Consequently, a differential pressure being proportional to the foot effort is brought to bear at the movable wall 7, which generates a boosting power which is added to the pedal force and is transmitted to the primary piston 55 of the master brake cylinder 2 in order to build up a hydraulic pressure in the two pressure chambers 81 and 82 which is conveyed through the brake circuits 12 and 13 to the individual wheel brakes 20, 21, 22, and 23.

The actuation and the release of the brakes, thus, works just as in a prior-art vacuum brake power booster.

If and when in the course of a braking operation the locking of the associated wheel is detected by one or several of the sensors 25, 26, 27, 28, the pressure built up in the master cylinder 2 must be cancelled at least partly. Let us assume that the power enacted on the brake pedal 3 remains constant. After the forementioned locking tendency has been signalled to the central electronic control unit 33 by one of the sensors, the former unit will generate change-over signals which effect a simultaneous change-over both of the two 2/2-way valves 40, 42 of the valve arrangement 39 and, consequently, an aeration of the master brake cylinder-side power chamber 5 of the vacuum brake power booster 1, and of the retaining valves 46, 46', so that the hydraulic chamber 50 will be shut off and the brake pedal 3 will remain in the position it has assumed by the control action. Since no differential pressure does now act on the movable wall 7 (the brake pedal-side power chamber 6 remains subject to the atmospheric pressure as before), the boosting power so determined will also disappear. The described elimination of the boosting power has, therefore, the result of a pressure reduction within the master brake cylinder 2. Thanks to the use of the pressure sensor 24 it is safeguarded that in the event of a determined vacuum level being fallen short of the control function of the inventive brake unit is switched off by the central electronic control unit 33.

Now, if and when in the course of a starting procedure the spinning of the associated wheel is detected by one or several of the sensors 25 to 28 it will be necessary to brake that wheel. After the forementioned tendency of spinning of the wheel has been signalled to the central electronic control unit 33 by one of the sensors, the former unit will generate a control signal which effects a simultaneous change-over of the two 2/2-way valves 84 and 85 of the second valve arrangement 83. As a result, the link 86 of the two power chambers 5 and 6 of the vacuum brake power booster 1 will be interrupted and the second power chamber 6 will be aerated, so that a differential pressure will originate at the movable wall 7 which will cause the latter to move in the direction of the master brake cylinder 2. This motion will be transmitted to the primary piston 55 of the master brake cylinder 2, as a result whereof hydraulic pressure will be built up in the latter's two pressure chambers 81 and 82, which pressure will be conveyed over the brake circuits 12 and 13 to the individual wheel brakes 20, 21, 22, and 23. It is safeguarded during this procedure that exclusively the valve associated with the spinning wheel remains open, while the other wheel valves will be closed.

The present invention also offers the possibility of monitoring the function of the retaining valve 46 shutting off the hydraulic chamber 50, in which no activity of the driver is needed, which is, however, of great importance for an anti-locking control action. During starting of the vehicle the traction slip control function is selected by the central electronic control unit 33. During the subsequent motion of the movable wall 7, respectively of the intermediate piston 79 the hydraulic fluid will be displaced from the annular chamber 88 through the open retaining valve 46 into the reservoir chamber 50 where the flow rate is measured and, thus, any defect of the retaining valve 46 can be recognized and be indicated.

Figure 5:
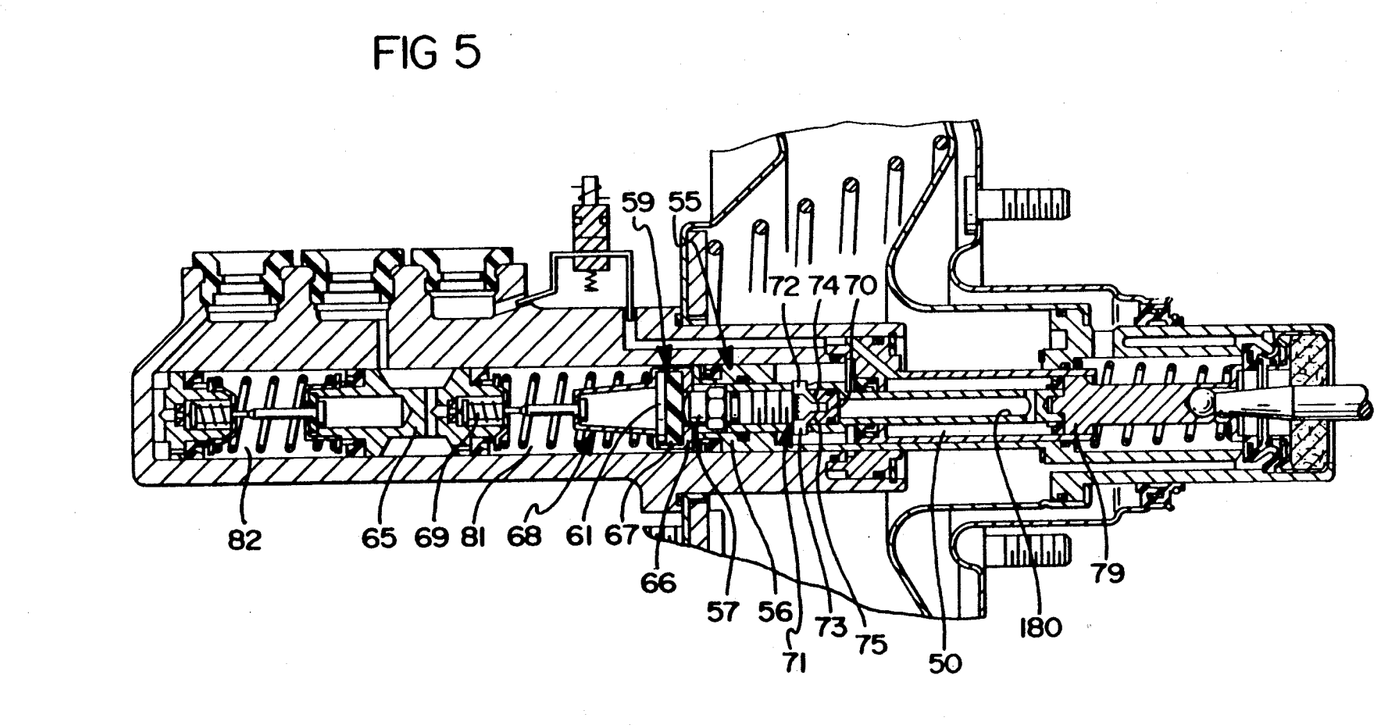
FIG. 5 shows a part-illustration of a second embodiment of the inventive vacuum brake power booster in an axial sectional view.

In the embodiment of the assembly composed of the vacuum brake power booster and the tandem master brake cylinder as shown in FIG. 5 the reaction device 59 is formed by an elastic reaction disc 67 being arranged in a cylindrical body 66 which is in abutment against the external piston 56, said reaction disc 67 being in direct contact with the internal piston 57, on one side, and interacting with an opening mechanism 68 of the first central valve 69 by means of a pressure plate 61, on the other side. In this embodiment, the intermediate piston 79 is formed with an axial bore 180 being in connection with the hydraulic chamber 50 and offering the possibility to subject to the action of the hydraulic fluid an actuating piston 70 which is disposed at its end and which mechanically actuates a stopping apparatus 71 limiting a relative motion of the external piston 56 in respect of the internal piston 57. Said stopping apparatus 71 is comprised of at least two elastically prestressed segments 72, 73 which are arranged symmetrically opposite each other and which allow to be moved vertically by means of two slopes 74, 75 being configurated at the actuating piston 70. In this manner, the lost travel mentioned in the beginning is virtually eliminated in the event of a normal braking operation, while it will nevertheless be safeguarded that the effect of the stopping apparatus 71 is cancelled in the event of a control action.

Figure 6:
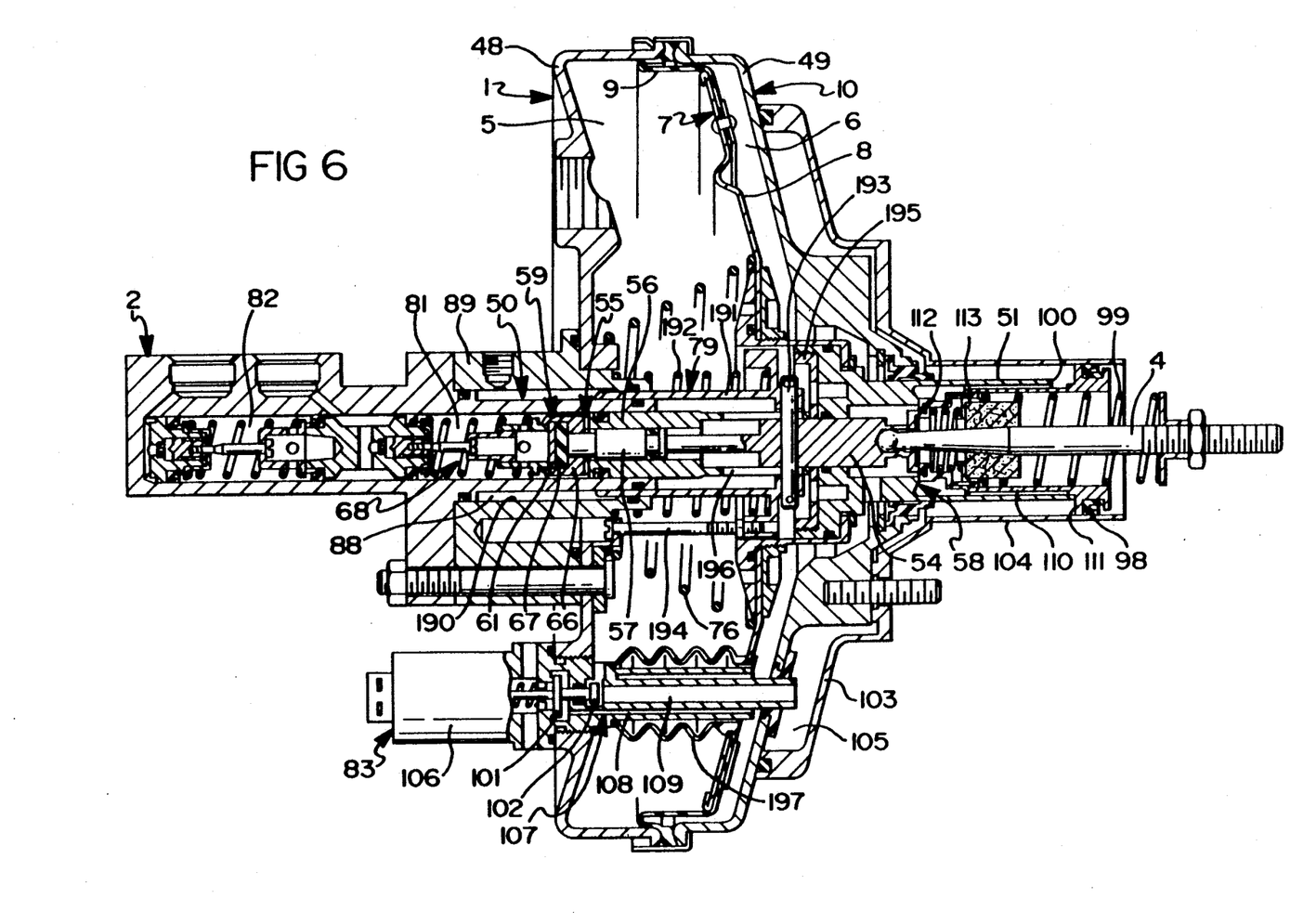
FIG. 6 shows the cross section through a third embodiment of the vacuum brake power booster.

In the third embodiment of the assembly comprised of the vacuum brake power booster and the tandem master brake cylinder used in the inventive automotive vehicle brake unit as per FIG. 1 which is shown in FIG. 6 the tandem master cylinder 2 is coupled to the housing part 48 shown on the left side of the drawing by means of an intermediate element 89. The hydraulic chamber 50 which is mentioned, for example, in connection with FIG. 2 is formed by an annular chamber 88 being defined, on one side, by the wall of a bore 190 which is provided in said intermediate element 89 and, on the other side, by the tandem master brake cylinder 2 which is slid into that bore 90.

The intermediate piston 79 which is configurated in the shape of an annular piston 191 and is prestressed in the direction of the movable wall 7 by a compression spring 192 is coupled to the valve piston 54 by means of a transverse pin 193 and captivated at the left housing part 48 as viewing the drawing by means of a captivating screw 194. At its master brake cylinder-side end, the valve piston 54 forms a part (internal piston 57) of the primary piston 55 defining the primary pressure chamber 81, whose second part (external piston 56) is supported at the control valve housing 51 through a cylindrical bowl element 195 which is in axial abutment against the control valve housing 51. The external piston 56 is furnished with a recess 196 which renders possible a relative motion of the two primary piston parts 56, 57.

Jointly with a flange 103 fastened to it, the brake pedal-side housing part 49 defines an annular pneumatic chamber 105. In this configuration, the flange 103 is formed with an axial extension 104 which radially surrounds a portion of the control vale housing 51 projecting from the booster housing 10. A metal bushing 110 being axially supported at the control valve housing 51 and guided within the axial extension 104 by means of a guide collar 111 is inserted in the control valve housing 51. Said guide collar 111 is furnished with a sealing cup 98 in order to seal off the annular chamber 105 toward the outside. At its end projecting into the interior space of the control valve housing 51 the bushing 111 bears an elastic poppet valve body 112 which interacts as a closing element with one each sealing seat being configurated at the valve piston 54, respectively at the control valve housing 51 and which forms the valve arrangement 58 jointly with said sealing seats. The bushing 110 is furnished with guide tongues 113 in this range which contribute to its better guidance within the control valve housing 51. In the range in which the bushing 110 is supported at the control valve housing 51, the control valve housing 51 is formed with openings 100 at its periphery which connect its interior space with the annular pneumatic chamber 105. At the front side of the poppet valve body 112 which is retained by the bushing 110 a piston rod return spring 99 takes support which takes care of prestressing the sealing seat configurated at the valve piston 54 in respect of the sealing surface of the poppet valve body 112.

The second valve arrangement 83 mentioned in connection with FIG. 1 is formed in the illustrated example by an electromagnetically actuatable 4/2-way valve 106 which is secured to the front housing part 48 and is furnished with two plate-shaped, coaxially arranged sealing elements 101, 102 which interact with two sealing seats being configurated correspondingly. Two pneumatic ducts 108, 109 being arranged coaxially in respect of each other and extending through the booster housing 10 are thereby shut off, respectively released, the duct 109 disposed radially internally ending up in the first power chamber 5 and in the annular chamber 105 and forming the link 86 between the first power chamber 5 and the second power chamber 6 mentioned in connection with FIG. 1, while the second duct 108 disposed radially externally takes care of a direct link 107 of the second power chamber 6 with the atmosphere, which bears reference numeral 72 in FIG. 1. In order to realize a division of the two power chambers 5 and 6 in the range of the pneumatic ducts 108, 109, a boot 197 is provided which is secured, on one side, in the diaphragm disc 8 and, on the other side, in the vicinity of the mouth of the duct 109 at the valve 106.

Figure 7:
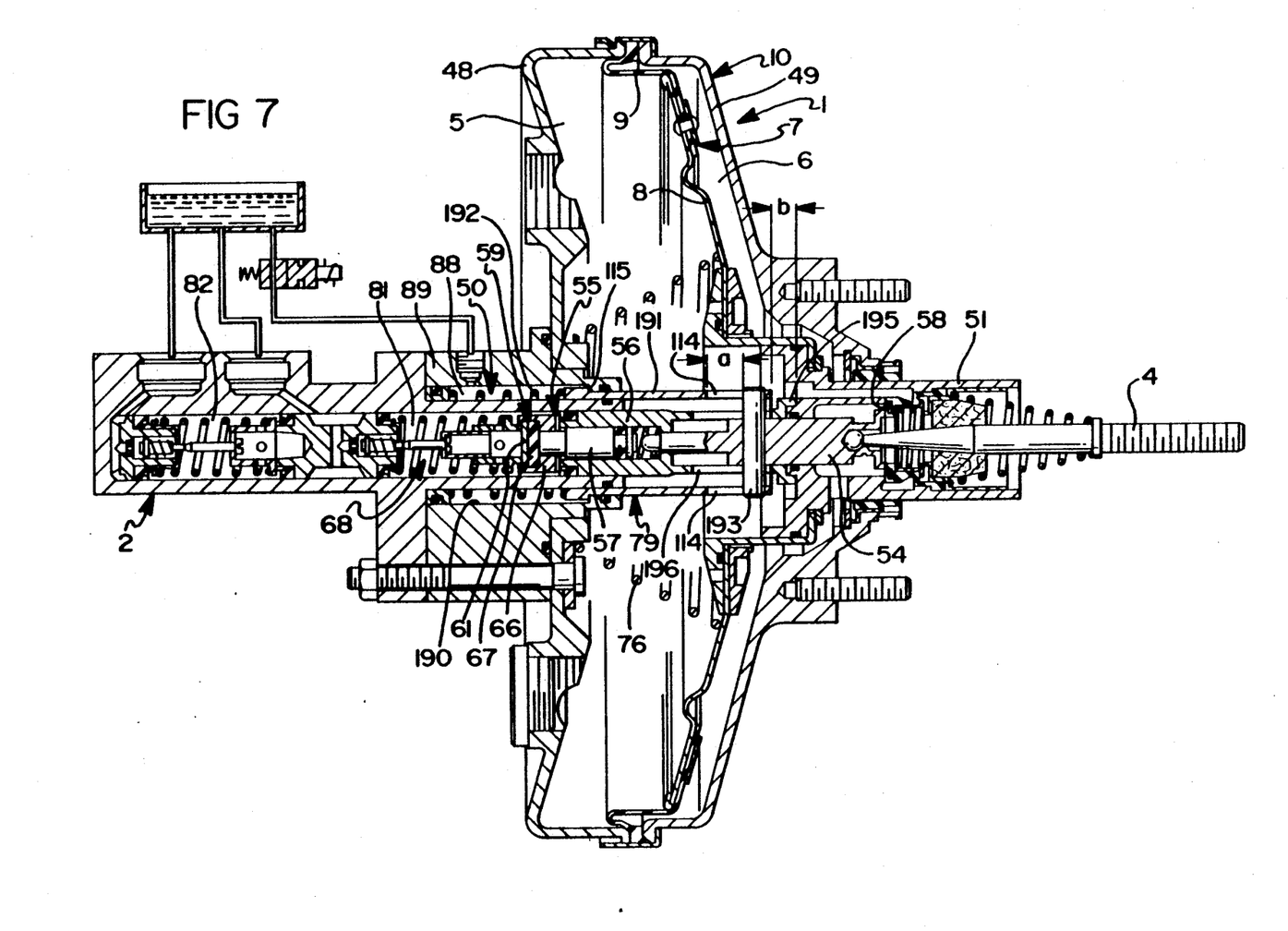
FIG. 7 shows a fourth embodiment of the vacuum brake power booster used in the automotive vehicle brake unit as per FIG. 1 in an axial sectional view.

In the vacuum power booster 1 shown in FIG. 7, the intermediate piston 79 (annular piston 91) being prestressed in the direction of the movable wall 7 by the compression spring 192 arranged within the hydraulic chamber 50 is in abutment, in the position of rest, against an annular surface 115 configurated at the intermediate element 89 and is furnished, at its end facing the movable wall 7, with axially extending slots 114 which guide a power transmitting element (transverse pin 193) projecting through the valve piston 54. The length of the slots 114 is preferably sized such that the input member 4, respectively the valve piston 54 can move a determined limited distance in the direction of actuation before the power transmitting element comes to be abutted against the intermediate piston 79.

In this context, the arrangement is preferably selected such that the end of the intermediate piston 79 is disposed at a distance b from the movable wall 7, respectively from the control valve housing 51 rigidly coupled to it, which distance is smaller in the example shown in the drawing than the length a of the slots 114, so that the intermediate piston 79 allows to be entrained by the movable wall 7 in the event of actuation. As a consequence, a falling-through of the input member 4, respectively 54 occurs in the event of an anti-locking control action, whose entity corresponds to the difference (b−a).

However, else an arrangement can be imagined in which the axial distance a between the power transmitting element 193 and the intermediate piston 79 is smaller than the distance b between the movable wall 51, respectively 12 and the intermediate piston 79.

Figure 8:
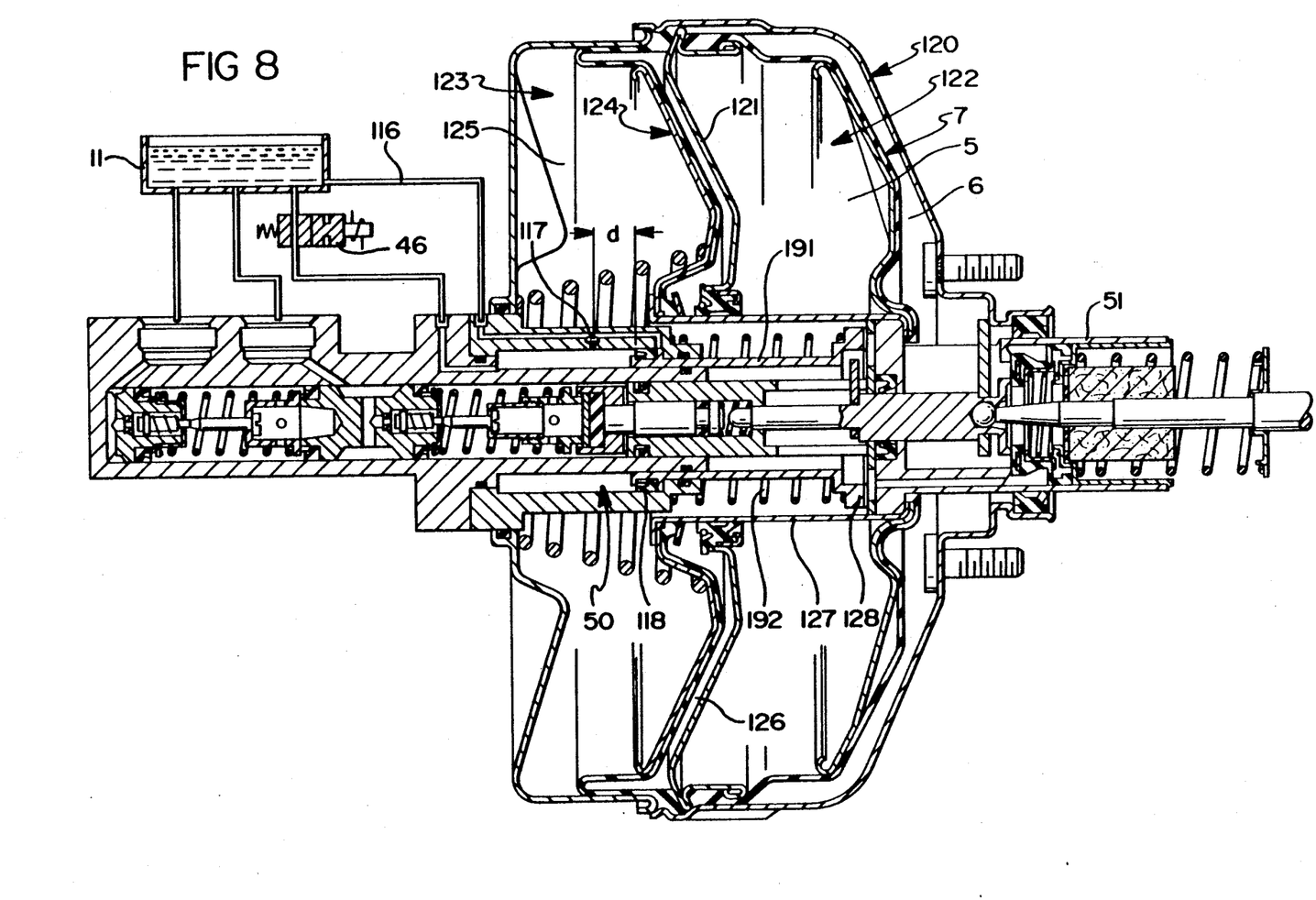
FIG. 8 shows a fifth embodiment of the vacuum brake power booster used in the automotive vehicle brake unit as per FIG. 1 in an axial sectional view.

In the embodiment shown in FIG. 8, a tandem-design brake power booster is provided as a vacuum brake power booster 1 whose housing 120 is subdivided into two pneumatic chambers 122 and 123 by a partition wall 121. While the first pneumatic chamber 122 corresponds to the interior space of the booster housing 10 of the vacuum brake power booster 1 illustrated in FIG. 2, the second pneumatic chamber 123 is subdivided by a second movable wall bearing reference numeral 124 into a third power chamber 125 being in connection with the first power chamber 5 and a fourth chamber 126 being in connection with the second power chamber 6. The transmission of the boosting power enacted by the second movable wall 124 to the control valve housing 51 being in active connection with the (primary) external piston 56 of the tandem master cylinder 2 takes place by means of a metal bushing 127 which sealedly passes through the partition wall 121. In this embodiment, the annular piston 191 is furnished at its end facing the control valve housing 51 with a radial collar 128 which serves, on one side, as a support surface for the compression spring 192 prestressing the annular piston 191 and is, on the other side, in abutment in axial direction with the front surface of the control valve housing 51, so that a power-transmitting connection exists between the control valve housing 51 and the annular piston 191.

As is seen from FIG. 8, in addition to the link between the hydraulic chamber 50 and the hydraulic fluid reservoir 11 which is mentioned in connection with FIG. 1 and allows to be shut off by means of the retaining valve 46, a second link 116 is provided which allows to be shut off by the annular piston 191 when the tandem brake power booster is actuated. For this purpose, an opening (breather hole) 117 follows the second link 116 shown in a diagrammatic representation, which opening 117 ends up in the hydraulic chamber 50 and interacts with a sealing element 118 (sealing cup) being secured in the front range of the annular piston 191. In this configuration, said opening 117 is preferably arranged at a distance d from the sealing element 118 which as to its function corresponds to the distance b mentioned in connection with FIG. 7, so that the second link 116 will allow to be shut off only when the annular piston 191 has moved a distance corresponding to the distance d. In order to effectively damp the powerless falling-through of the input member 4 in the event of an anti-locking control action, said opening 117 may be configured in the shape of a restriction hole.

Figure 9:
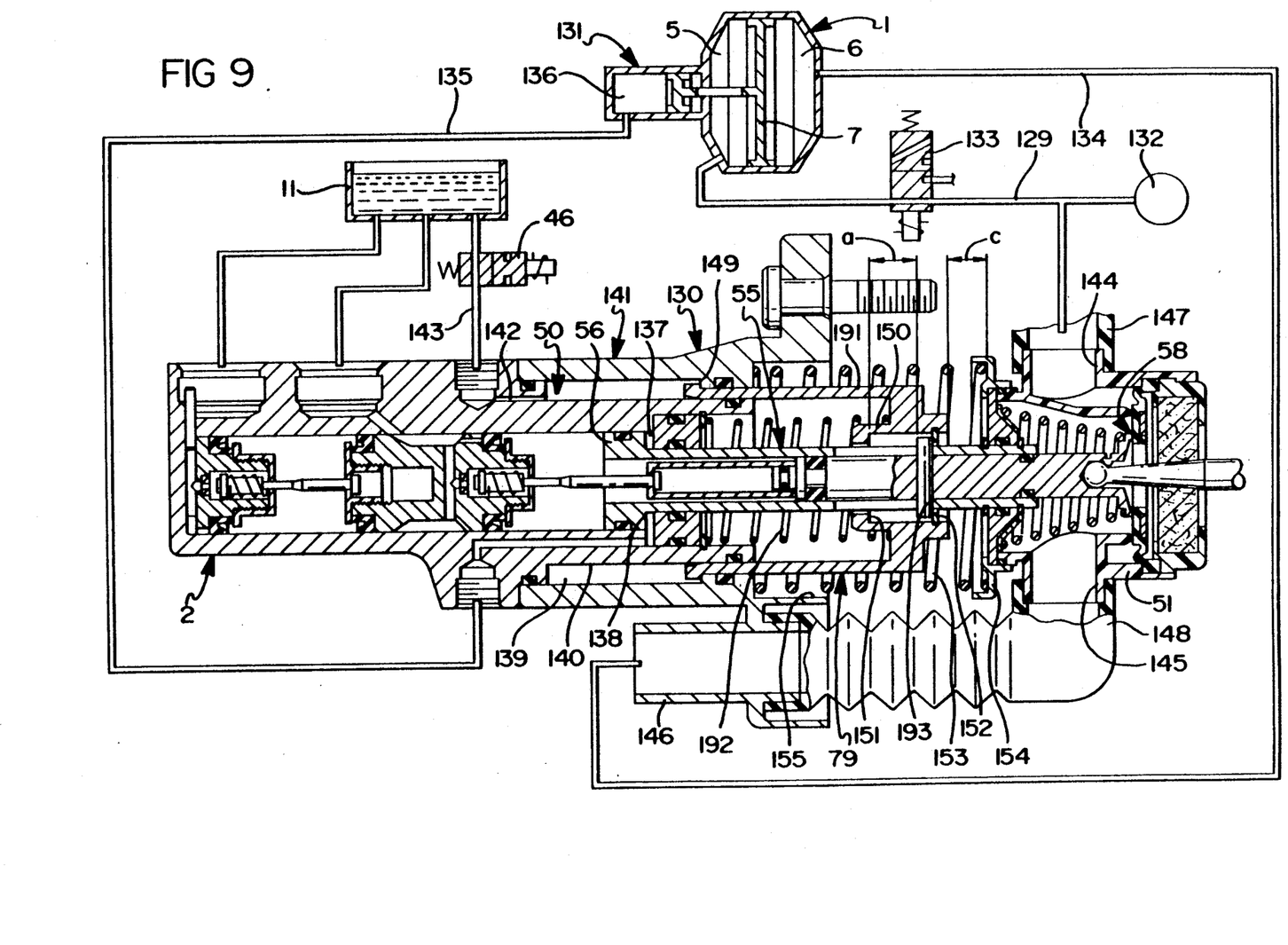
FIG. 9 shows an actuating unit applicable in an automotive vehicle brake unit as per FIG. 1 featuring a disentangled design, in an axial sectional view.

In the design version of the inventive actuating unit shown in FIG. 9, the master brake cylinder 2, the hydraulic chamber 50, the annular piston 191 guided therein and the control assembly formed by the control valve housing 51 and the control valve 58 constitute a constructional unit 130 which is arranged separately from the brake power booster 1. The brake power booster 1 is a vacuum brake power booster of conventional type in which the mechanical or hydraulic control element is missing and which is succeeded by an auxiliary master cylinder 131.

Reference numeral 129 identifies a vacuum line which conveys vacuum from the intake of the internal combustion engine 132 of the vehicle (or from another suitable vacuum source) to the vacuum chamber 5 of the brake power booster 1 and to the unit 130 which will be described in more detail below. The vacuum chamber 5 is connected to the vacuum line 129 through a pneumatic 3/2-way valve 133 which in the event of a control action allows to aerate the vacuum chamber 5.

Reference numeral 134 denotes the line for the controlled pneumatic pressure, while the line 135 carries controlled hydraulic pressure and connects a pressure chamber 136 of the auxiliary master cylinder 131 to an annular chamber 137 configured in the master brake cylinder 2. The annular chamber 137 is defined by an annular surface 138 configured at the external piston 56 and jointly with the former constitutes a hydraulic booster. The hydraulic chamber 50 is formed by an annular chamber 139 in the example illustrated which is defined between a flange section 141 radially surrounding a section 140 of the master brake cylinder 2 and the surface of said master cylinder section 140 and is in connection through a hydraulic fluid duct 142 and a hydraulic line 143 with the pressureless hydraulic fluid reservoir 11 shown only diagrammatically, said connection allowing to be shut off in the event of a control action by means of the retaining valve 46 which is inserted in the line 143.

The control valve housing 51 being unslidably secured on the external piston 56 is furnished with two pneumatic connections 144 and 145, the former one (144) being connected to a connecting socket not shown in the drawing and configured at the flange section 141, which socket is in connection with the vacuum line 129, while the second one (145) is in connection with a second connecting socket 146 configured at the flange section 141, to which socket the line 134 for the selected pneumatic pressure is connected. The connections 144 and 145 configured at the control valve housing 51 preferably in radially opposite position are in connection with the connecting sockets at the flange section 141 through elastic connecting elements 147, 148, for example boots. This arrangement will offer the possibility of an evacuation, respectively of a dosable aeration of the power chamber 6 of the brake power booster 1.

The intermediate piston 79 being axially abutted against a stop 149 configured at the flange section 141, prestressed by the compression spring 192 and configurated in the shape of an annular piston 191 is furnished at its end facing the control valve housing 51 with an axial hub 150 which serves as a guide for the compression spring 192 and presents a stop collar 151 with which the power transmitting element (transverse pin 193) radially projecting through the primary piston 55 interacts. In the position of rest, the power transmitting element 193 is in abutment with a stop, respectively with a circlip 152 which is inserted in the wall of the hub 150.

In order to render possible a transmission of the boosting power enacted by the brake power booster 1 to the intermediate piston 79 only when the primary piston 55, respectively the control valve housing 51 has moved a determined limited distance, the front surface of the control valve housing 51 is positioned at a distance c from the end of the intermediate piston 79, said distance c being selected smaller in the illustrated embodiment than the distance a between the transverse pin 193 and the annular surface which is configurated at the stop collar 151.

In order to achieve a complete reduction of the hydraulic pressure controlledly existing in the tandem master brake cylinder 2, a compression spring 153 is, finally, provided which is supported, on one side, at a spring retainer 154 fastened to the control valve housing 51 and, on the other side, at the bottom of a recess 155 provided at the flange section 141.

Figure 10:
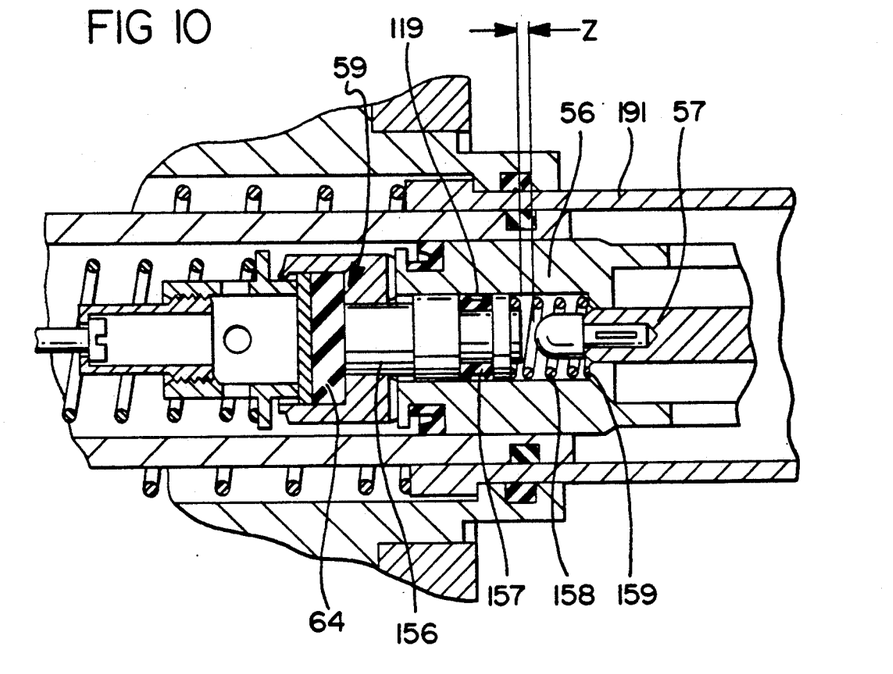
FIG. 10 is an upscaled representation showing the configuration of the primary piston delimiting the primary pressure chamber as per FIG. 7.
Figure 11:
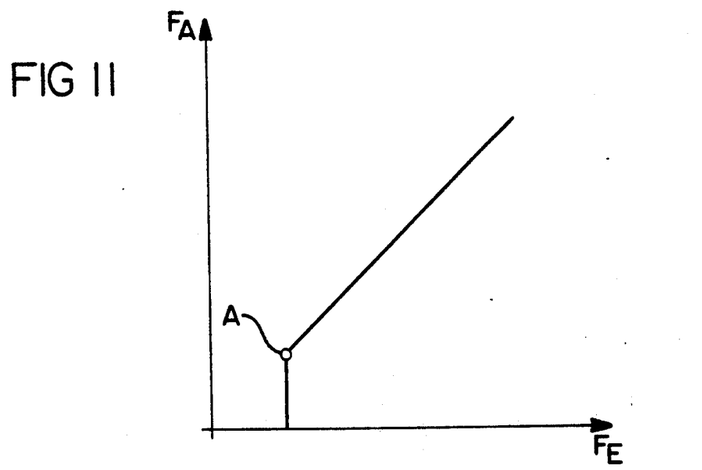
FIG. 11 is a graphical representation of a response characteristic of the vacuum brake power booster shown in FIGS. 7 and 8 which presents a "jumper effect"

As is, finally, seen in FIG. 10, the internal piston 57 interacts in the embodiment shown in FIGS. 7 and 8 with a power transmitting element 156 which is arranged at a distance z from it, is axially abutted against the reaction disc 64 and is slidably guided within the bore 119 of the external piston 56 accommodating the internal piston 57. The power transmitting element 156 whose left front face as viewed in the drawing is subjectible to the hydraulic pressure existing in the primary pressure chamber is sealed off in respect of the wall of the bore 119 by a sealing cup 157, its other front face serving as an abutment surface for a compression spring 158 which takes support at a radial annular surface 159 being configurated at the external piston 56 and which in the mounting condition has a distended length, that is to say, a straight length without any prestressing. The spring power of the compression spring 158 counteracts the power of reaction resulting from the hydraulic pressure in the primary pressure chamber 81 and determines the size of the sharp rise of the response characteristic (FIG. 11).

The pressure acting during braking on the front surface of the power transmitting element 156 results in a slide of the power transmitting element 156 contrary to the direction of actuation, respectively against the power of the compression spring 158. When the spring power of that compression spring 158 is overcome, the power transmitting element 156 will come to be abutted against the internal piston 57 (point A in FIG. 11), so that the reaction power resulting from the hydraulic pressure in the primary pressure chamber 81 will come to be felt at the actuating member 4. By varying the spring power of the compression spring 158, any desired response behaviour of the brake power booster allows to be adjusted.

Figure 12:
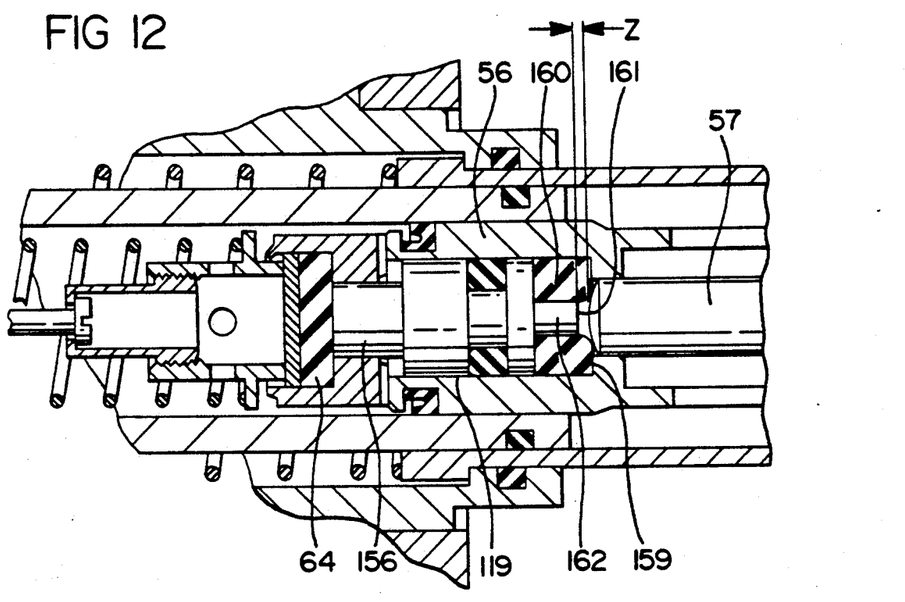
FIG. 12 shows another configuration of the primary piston shown in FIG. 10.
Figure 13:
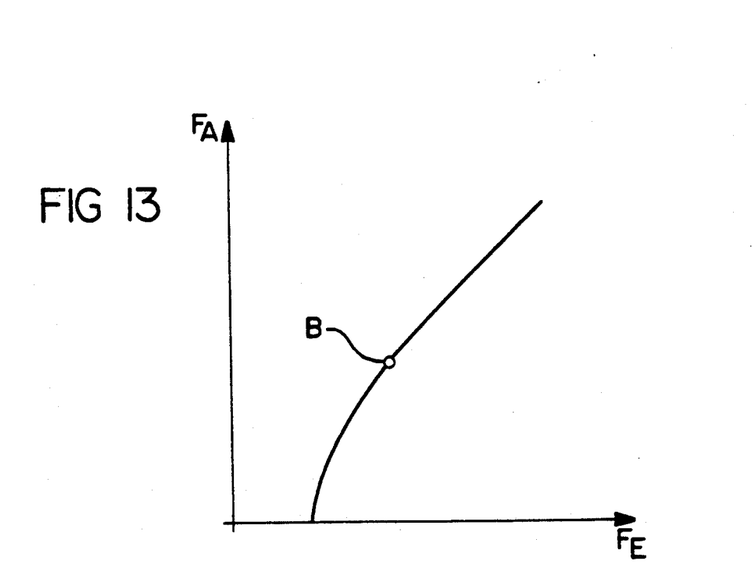
FIG. 13 is a graphical representation of a response characteristic in the shape of a rounded characteristic curve being realizable by the arrangement according to FIG. 12.

Now, if a response characteristic with the course shown in FIG. 13 ("rounded characteristic curve") is desired, which guarantees a slight reaction at the actuating member 4 from the beginning which increases continuously until the full ratio of the brake power booster has been reached (point B in FIG. 13), then the arrangement shown in FIG. 12 will be used as the first reaction device. In this arrangement, a rubber spring 160 is disposed between the power transmitting element 156 and the end of the internal piston 57, which rubber spring 160 is formed with a conical recess 161 at its front surface facing the internal piston 57. In this configuration, the end of the internal piston 57 preferably has calotte shape, respectively truncated cone shape and can in the position of rest either slightly touch the rubber spring 160 or be disposed at a slight axial distance from it. In order to protect the rubber spring 160 from increased wear, the power transmitting element 156 is furnished at its front surface facing the rubber spring 160 with an axial extension 162 which extends all through the rubber spring 160 and whose length is sized such that the forementioned distance z exists between said extension 162 and the end of the internal piston 57. Preferably, the outer contour of the rubber spring 160 is selected such that at a power enacted by the power transmitting element 156 only a partial abutment takes place at the internal piston 57, in the event of an increase of the said power, the abutment area and, consequently, the transmittable reaction power becoming larger. The increase of the power, respectively the size-increase of the abutment area will be limited by the direct mechanical contact between the internal piston 57 and the axial extension 162.

We claim:

1. An automotive vehicle brake unit with an antilocking device comprising: a vacuum brake power booster functionally disposed intermediate a brake pedal and a master brake cylinder and including at least two power chambers divided from each other by a movable wall, the first of said chambers connectible to a vacuum source and the second of said chambers aeratable through a control valve actuatable by an input member coupled to the brake pedal to effect generation of boosting power being proportional to the power applied to the brake pedal, said first power chamber aeratable by a first valve arrangement; wheel cylinders connected to primary and secondary pressure chambers of the master brake cylinder through brake lines; sensors associated with wheels to be braked operative to monitor the rotating behavior of the wheels and to generate output signals in response thereto; a central electronic control unit operative to receive said output signals and to generate control signals as a function thereof; electromagnetically actuatable hydraulic fluid inlet and outlet valves inserted in the brake lines response to said output signals for effecting slip control, wherein said wall of said vacuum brake power booster is movable independently of said input member and is in power-transmitting connection with a portion of a primary piston partially defining said pressure chamber; and a further hydraulic chamber defined by and reacting between piston means carried for displacement with said input member and a fixed portion of said unit and selectively communicating through a link with a pressureless hydraulic fluid reservoir including direct acting valve means, said link operable to interrupt said communication between said further chamber and reservoir in response to said control signals, wherein the further hydraulic chamber is configured in a cylindrical section closing an axial extension of said master brake cylinder projecting into said first power chamber of said vacuum brake power booster.

2. An automotive vehicle brake unit with an antilocking device comprising: a vacuum brake power booster functionally disposed intermediate a brake pedal and a master brake cylinder and including at least two power chambers divided from each other by a movable wall, the first of said chambers connectible to a vacuum source and the second of said chambers aeratable through a control valve actuatable by an input member coupled to the brake pedal to effect generation of boosting power being proportional to the power applied to the brake pedal, said first power chamber aeratable by a first valve arrangement; wheel cylinders connected to primary and secondary pressure chambers of the master brake cylinder through brake lines; sensors associated with wheels to be braked operative to monitor the rotating behavior of the wheels and to generate output signals in response thereto; a central electronic control unit operative to receive said output signals and to generate control signals as a function thereof; electromagnetically actuatable hydraulic fluid inlet and outlet valves inserted in the brake lines responsive to said output signals for effecting slip control, wherein said wall of said vacuum brake power booster is movable independently of said input member and is in power-transmitting connection with a portion of a primary piston partially defining said pressure chamber; and a further hydraulic chamber defined by and reacting between piston means carried for displacement with said input member and a fixed portion of said unit and selectively communicating though a link with a pressureless hydraulic fluid reservoir including direct acting valve means, said link operable to interrupt said communication between said further chamber and reservoir in response to said control signals, wherein said link of said hydraulic chamber to said hydraulic fluid reservoir includes at least one retaining valve.

3. An automotive vehicle brake unit as claimed in claim 2, characterized in that said retaining valve is configured in the shape of a solenoid valve, open when de-energized which is energizable by output signals of said central electronic control unit.

4. An automotive vehicle brake unit with an antilocking device comprising: a vacuum brake power booster functionally disposed intermediate a brake pedal and a master brake cylinder and including at least two power chambers divided from each other by a movable wall, the first of said chambers connectible to a vacuum source and the second of said chambers aeratable through a control valve actuatable by an input member coupled to the brake pedal to effect generation of boosting power being proportional to the power applied to the brake pedal, said first power chamber aeratable by a first valve arrangement; wheel cylinders connected to primary and secondary pressure chambers of the master brake cylinder through brake lines; sensors associated with wheels to be braked operative to monitor the rotating behavior of the wheels and to generate output signals in response thereto; a central electronic control unit operative to receive said output signals and to generate control signals as a function thereof; electromagnetically actuatable hydraulic fluid inlet and outlet valves inserted in the brake lines responsive to said output signals for effecting slip control, wherein said wall of said vacuum brake power booster is movable independently of said input member and is in power-transmitting connection with a portion of a primary piston partially defining said pressure chamber; and a further hydraulic chamber defined by and reacting between piston means carried for displacement with said input member and a fixed portion of said unit and selectively communicating through a link with a pressureless hydraulic fluid reservoir including direct acting valve means, said link operable to interrupt said communication between said further chamber and reservoir in response to said control signals, wherein said further hydraulic chamber includes an elongated intermediate piston interacting with said input member at one end hereof, and with said primary piston of said master brake cylinder on the other end thereof.

5. An automotive vehicle brake unit with an antilocking device comprising: a vacuum brake power booster functionally disposed intermediate a brake pedal and a master brake cylinder and including at least two power chambers divided from each other by a movable wall, the first of said chambers connectible to a vacuum source and the second of said chambers aeratable through a control valve actuatable by an input member coupled to the brake pedal to effect generation of boosting power being proportional to the power applied to the brake pedal, said first power chamber aeratable by a first valve arrangement; wheel cylinders connected to primary and secondary pressure chambers of the master brake cylinder through brake lines; sensors associated with wheels to be braked operative to monitor the rotating behavior of the wheels and to generate output signals in response thereto; a central electronic control unit operative to receive said output signals and to generate control signals as a function thereof; electromagnetically actuatable hydraulic fluid inlet and outlet valves inserted in the brake lines responsive to said output signals for effecting slip control, wherein said wall of said vacuum brake power booster is movable independently of said input member and is in power-transmitting connection with a portion of a primary piston partially defining said pressure chamber; and a further hydraulic chamber defined by and reacting between piston means carried for displacement with said input member and a fixed portion of said unit and selectively communicating through a link with a pressureless hydraulic fluid reservoir including direct acting valve means, said link operable to interrupt said communication between said further chamber and reservoir in response to said control signals, wherein in said primary pressure chamber a reaction device is arranged which in the event of a failure of the brake circuit connected to it renders possible a pressure build-up in the secondary pressure chamber in accordance with a characteristic curve fixed previously and proportional to the input power.

6. An automotive vehicle brake unit as claimed in claim 5, characterized in that said reaction device is formed by one each annular surface being configurated at said external piston, respectively at said internal piston and interacting with an annular elastic reaction element which is preferably arranged at said secondary piston.

7. An automotive vehicle brake unit with an antilocking device comprising: a vacuum brake power booster functionally disposed intermediate a brake pedal and a master brake cylinder and including at least two power chambers divided from each other by a movable wall, the first of said chambers connectible to a vacuum source and the second of said chambers aeratable through a control valve actuatable by an input member coupled to the brake pedal to effect generation of boosting power being proportional to the power applied to the brake pedal, said first power chamber aeratable by a first valve arrangement; wheel cylinders connected to primary and secondary pressure chambers of the master brake cylinder through brake lines; sensors associated with wheels to be braked operative to monitor the rotating behavior of the wheels and to generate output signals in response thereto; a central electronic control unit operative to receive said output signals and to generate control signals as a function thereof; electromagnetically actuatable hydraulic fluid inlet and outlet valves inserted in the brake lines responsive to said output signals for effecting slip control, wherein said wall of said vacuum brake power booster is movable independently of said input member and is in power-transmitting connection with a portion of a primary piston partially defining said pressure chamber; and a further hydraulic chamber defined by and reacting between piston means carried for displacement with said input member and a fixed portion of said unit and selectively communicating through a link with a pressureless hydraulic fluid reservoir including direct acting valve means, said link operable to interrupt said communication between said further chamber and reservoir in response to said control signals, wherein said valve means of said link of said hydraulic chamber comprises two retaining valves connected in parallel, wherein individual parallel branches of said link are each connected to a hydraulic fluid chamber whereby variation of filling level of which is measurable by associated measuring apparatus operative to generate output signals which, when compared to each other, in case of detection of a divergence a differential signal being generated, activates a warning device.

8. An automotive vehicle brake unit as claimed in claim 7, characterized in that said hydraulic fluid chambers are disposed within said hydraulic fluid reservoir.

9. An automotive vehicle brake unit as claimed in claim 7, characterized in that said measuring apparatus comprises a float which carries a ferromagnetic core interacting with a coil.

* * * * *